March 9, 1943.  P. MAINARDI ET AL  2,313,561
STEREOSCOPIC SYSTEM
Filed May 22, 1941  2 Sheets-Sheet 1

POMPEY MAINARDI
MARCUS N. MAINARDI
INVENTORS

BY
ATTORNEY

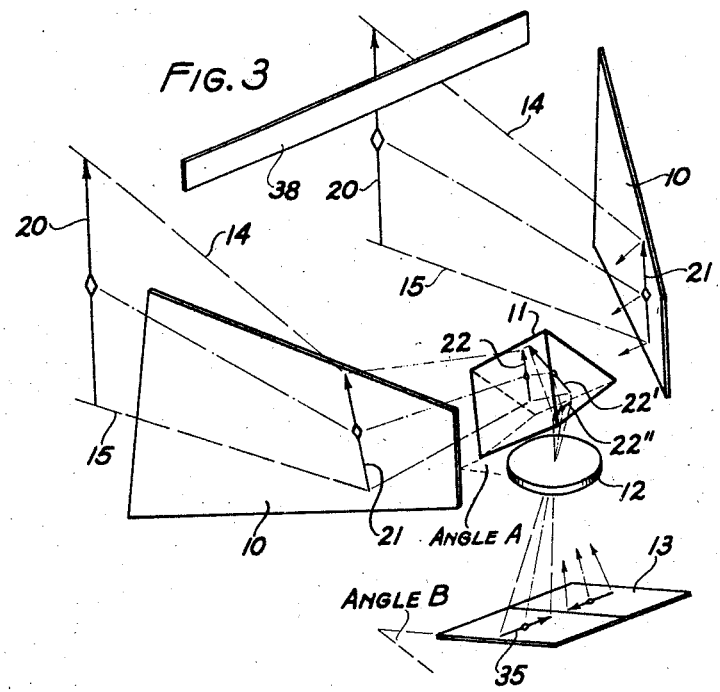
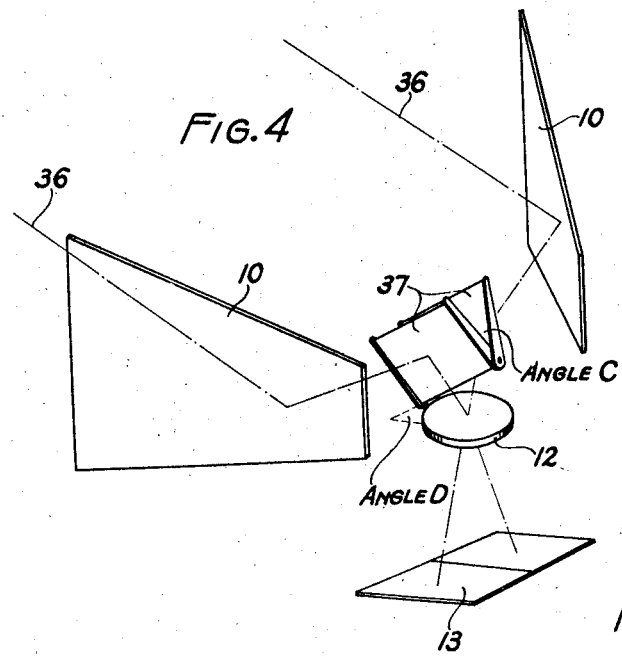

Patented Mar. 9, 1943

2,313,561

UNITED STATES PATENT OFFICE 2,313,561

STEREOSCOPIC SYSTEM

Pompey Mainardi and Marcus N. Mainardi, Paterson, N. J.

Application May 22, 1941, Serial No. 394,677

12 Claims. (Cl. 88—16.6)

This invention relates to stereoscopic systems, particularly to those of the type described in my copending application, Serial Number 394,676 filed concurrently herewith.

In optical systems for projecting from and particularly for taking stereoscopic pictures adjacent to one another on a film, with the images oppositiaxially oriented on the film, various double-mirror systems are possible. A preferred form of such systems as described in my copending application, involves an isoceles prism, preferably an equilateral prism immediately in front of the camera or projector objective. The simplest form of such a system, particularly when used on a camera, requires the camera to be held at an angle. It is the primary object of the present invention, to provide means whereby the camera may be held at a more convenient angle and still give properly oriented images.

The invention is equally applicable to a simple mirror system, i. e., one not employing a prism. In this case and also in the case of the prism where an additional mirror is added to the system, the object of the invention is to permit the use of smaller mirrors.

Oppositiaxial images, i. e., images which are head-to-head or foot-to-foot on the film and adjacent to one another, have two advantages. In the first place, their width is greater than their height which is desirable in the majority of pictures and in the second plate keystone distortion is either entirely eliminated, or if the camera is tipped at an angle to the horizontal, the keystone distortion is identical in the two pictures and hence introduces no eyestrain when an attempt is made to fuse the pictures stereoscopically. In addition to simplicity and accuracy, the use of a prism as described in my copending application permits the lens to be used efficiently for each of the pictures. The present invention simplifies the construction of the optical systems necessary to give these advantages and makes the systems more compact and more convenient to use.

According to the invention the system, which is useful either for projection equipment or for cameras includes two intersecting reflecting surfaces in front of the camera or projector lens to reflect the light coming to or from the lens and two outer reflectors preferably separated at the interocular distance, to receive light from the subject and reflect it to the intersecting reflecting surfaces, in the case of a camera and vice versa in the case of a projector. In order that the system be as compact and convenient as possible, the point of intersection between the reflecting surfaces is tipped at an acute angle to the principal planes of the lens, preferably between 5° and 25°, i. e., about 15°.

Of course, since light may travel in either direction through an optical system comprising simple reflecting surfaces and lenses, the optical system may be described, with respect to either direction of the light beams but the same system can be used either for projecting or taking.

Since most projectors require that the projection lamp be held in a vertical position and are made so that the lens has its optic axis substantially horizontal, it is usually desirable to provide means for using the projector without changing the orientation of its lens. As pointed out in my copending application, this may be done by the use of an additional mirror in the stereoscopic system or by rotating the whole system through 90° and placing a mask at the screen itself. In either of these arrangements, there is little or no advantage gained in having the intersecting reflecting surfaces tipped as just described. Therefore, the present invention is most useful for cameras and will be described particularly in that connection. The invention is most useful when an equilateral prism is used, but with either mirrors or prisms, the angle between the line of intersection and the principal planes of the lens should be between 5° and 25° and preferably about 15°.

An attachment for a camera may be made up with the prism adjacent to one window in the housing of the attachment and so oriented behind that window, that when the housing is attached to the camera lens, the prism is tipped at the desired angle. The front window of the housing through which light from the subject strikes the two outer reflectors is so arranged that the top or bottom edge of the window acts as a mask to prevent light in either beam overlapping the other beam at the rear focus of the lens. Since the amount of masking would, depend on vignetting and vary with lens aperture, this mask is preferably adjustable. It is convenient to provide such an attachment with a view finder mounted centrally above the prism and oriented so that its optic axis is parallel to rays from that part of the subject which corresponds to the mid point of each half of the picture frame at the back focus plane of the lens.

In the case where the intersecting reflectors consist of mirrors, the angle between these mirrors may be adjusted to any convenient orientation. In this case, the angle between the line of intersection and the prinicipal planes of the lens depends on the angle between the mirrors themselves, but for the purpose of the present invention, it is still preferably in the range of 5° to 25°. Of course, when a prism is used whose vertex angle is 60°, it is not absolutely necessary that the base face of the prism be parallel to this apex. However, for convenience in manufacture, this base face should be parallel to the apex, which is the line of intersection of the reflecting surfaces, and hence the base face should also be at an acute angle to the principal planes of the lens.

The invention and the advantages thereof will be more fully understood from the following description when read in connection with the accompanying drawings, in which:

Fig. 3 is a perspective view showing the principal elements of the invention.

Fig. 4 is a similar showing of an embodiment of the invention using mirrors instead of a prism.

Figure 1:
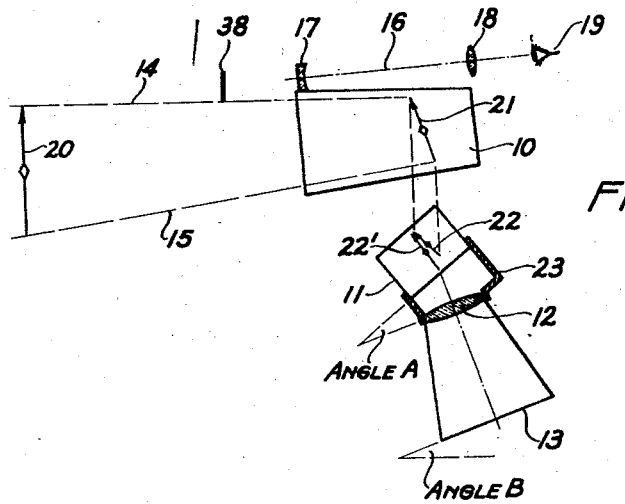
Fig. 1 shows one embodiment of the invention in elevation, partly in cross section.

One-half of a stereoscopic optical system is shown in Fig. 1 and consists of a reflector 10, a reflecting surface 11, a lens 12, and a back focus plane 13. The outer mirror 10 and the corresponding mirror in the other half of the system are spaced apart the interocular distance or possibly some other distance if accentuated stereo effects are desired. As the light beams are traced through the optical system in this drawing, the reflecting surface 11 is considered as one side face of an isosceles prism whose base face is adjacent to the lens 12 and tipped at an angle A with respect to the principal planes thereof. As shown by rays 14 and 15, light from the subject being photographed proceeds upright as shown by arrow 20 and strikes the mirror 10 as shown by the arrow 21 whence it is reflected through one of the side faces of the prism 11 to form the arrow 22. None of these arrows are actual images but merely show the orientation of the pencil of rays. After transmission through the side face of the prism together with any refraction due to the angle of incidence, the rays strike the other side face as shown by the arrow 22' and are reflected from there through the base face of the prism and through the lens 12 to the image plane 13.

A view finder for the system comprising a front lens 17 and an eye-piece 18, is conveniently mounted above and symmetrically between the two outer reflectors represented by the mirror 10, with the optic axis of the view finder directed toward the center of the field of view, parallel to a line bisecting the angle between the rays 14 and 15.

The rays from each half of the system cross each other in the lens 12 and are imaged oppositiaxially on the film 13 as best seen in Fig. 3. A mask 38 cutting off all rays above the ray 14 is provided to prevent any portion of either beam overlapping the other beam at the image frame 13. Referring to Fig. 3, it will be noted that each of the beams represented by the arrows 20 are rotated in opposite directions through 90° so that the images 35 on the image plane 13 are head-to-head, i. e., oppositiaxially oriented. To give an absolutely sharp cut off the mask 38 would have to be at the front focus of the lens but in the position shown it actually gives quite a sharp cut off with practically no vignetting. However, the residual vignetting does depend on lens aperture and hence the mask is preferably adjustable.

If the apex of the prism 11 were parallel to the principal planes of the lens 12, the angle B between the focal plane 13 and the horizontal (corresponding to the rays 14) is quite large and the camera extends back so that it is not convenient for the operator to place his eye 19 immediately behind the ocular 18 of the eye-piece. For many purposes it is desirable to hold the camera as nearly upright as possible during the taking of pictures. By means of a holder 23, the apex of the prism 11 is held at an acute angle A to the principal planes of the lens 12. In the arrangement shown in Fig. 1 the base face of the prism 11 is parallel to the apex thereof and hence the angle A is the angle between this base face and the principal planes of the lens 12. Due to refraction and changes in the angles of reflection by the tipping of the prism to the angle A, the angle B is considerably reduced and much more convenient arrangement results.

The arrangement of the arrows 21, 22, 22' and 22'' is best seen from Fig. 3 and is best described with reference to rays traveling from the image 35 outward. The equilateral prism 11 acts optically as a block of glass. The rays diverging from the centre of the lens 12 striking the base face of the prism 11 as shown by arrow 22'' continue their divergence to form the arrow 22. If this prism is drawn out as a block of glass, as is often done in optical design work, it will be noticed that the arrow 22' lies diagonally across the diverging beam and hence it is much longer than either of the other arrows. Because of the angle A, all rays at the arrow 22 are bent downward but those traveling through the foot of the arrow do not travel as great a distance before striking the side face of the prism. Hence, the point of the arrow in 22' is deviated more from the optic axis of the lens 12 than is the base of this arrow. This is best seen in Fig. 1. After reflection at this surface, however, the rays traveling to the base of the arrow 22 travel much further than those to the point thereof. Hence, the arrow 22 is tipped still further as shown. The outer mirrors 10 are oriented so as to provide the 90-degree rotation required.

Figure 2:
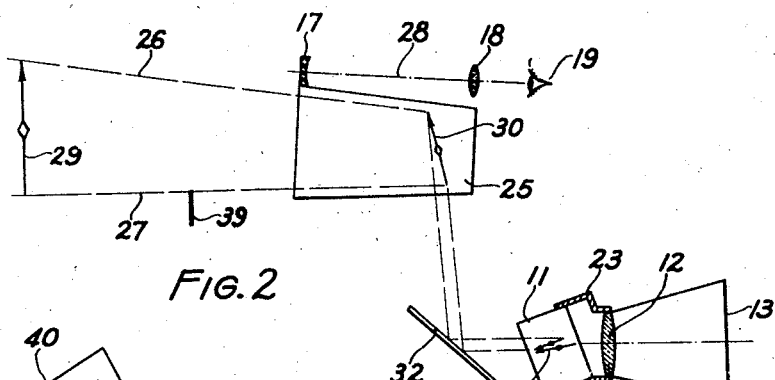
Fig. 2 shows a slight variation of the embodiment shown in Fig. 1.

Fig. 2 illustrates a variation of this embodiment of the invention wherein an additional mirror 32 is provided between the prism 10 and the outer mirrors 25 in this case. Due to lateral inversion, the lower ray 27 is the one corresponding to the optic axis of the lens and hence the mask 39 is placed adjacent to this ray. If the cameras shown in Figs. 1 and 2 are held as illustrated, i. e. with the rays corresponding to the optic axis of the lens, coming from the subject into the outer reflectors horizontally, there will be no keystone distortion in either of the stereo pictures. Tipping of the apparatus in either case, results in identical distortion in both pictures which is not objectionable. In Fig. 2 the upper ray from the subject represented by arrow 29 is labeled 26 and the optic axis of the view finder 28 is, as before, directed toward the center of the field of view. The images 30 and 31 correspond to 21 and 22' of Fig. 1. Since the mirror 32 may be placed at various angles, it is quite possible to have the film plane 13 perfectly vertical. Therefore, the sole advantage in having the prism 11 tipped at an angle A to the principal planes of the lens 12 is to permit the use of a smaller mirror in the position 32.

Fig. 4 is similar to Fig. 3 and illustrates how the invention may be applied to systems using mirrors entirely. Such systems have the disadvantage of reducing the effective aperture of the lens 12 to less than half unless the line of intersection is placed a great distance in front of the lens. However, when mirrors are used, there is considerable freedom regarding the angle C between the mirrors 37. The angle D between the line of intersection thereof and the principal planes of the lens 12 depends somewhat on what angle C is chosen. If the angle C is 90° so that the rays 36 coming into the mirrors 10 are reflected substantially horizontally inward to the mirrors 37, angle D may be zero as is known or very small. However, for smaller values of the angle C which are preferable, it is desirable to allow the angle D to have a finite value somewhere in the same range as for the prism, namely preferably between 5° and 25°.

Figure 5:
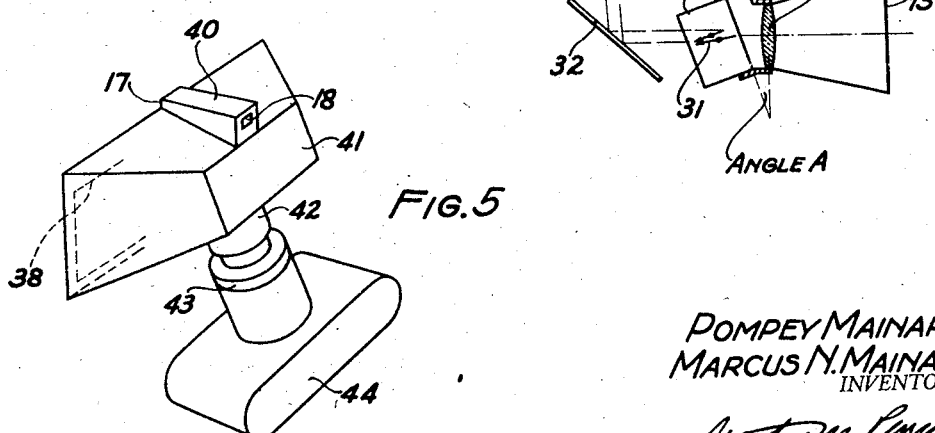
Fig. 5 is a perspective view of an attachment for a camera incorporating the present invention.

The preferred embodiment of the invention is in a camera attachment as shown in Fig. 5 in which the view finder 40, having lenses 17 and 18 corresponding to Fig. 1 is mounted on top of a housing 41 which includes the mirrors 10 and prism 11 of Fig. 1 and which has the front window of the housing arranged so that the upper edge of this window corresponds to the mask 38. This edge should preferably be vertically adjustable to correspond to different lens apertures. The attachment is attached by a sleeve 42 to the lens mount 43 of a camera 44.

Having thus described the preferred embodiments of our invention, we wish to point out that it is not to be limited to the structures, but is of the scope of the appended claims.

What we claim and desire to secure by Letters Patent of the United States is:

1. An optical system for projecting from or taking stereoscopic pictures adjacent to one another and oppositiaxially oriented on a film which system comprises an objective lens, means for holding the film in the back image plane of said lens, two intersecting reflecting surfaces positioned in front of the lens to receive respectively two light beams crossing at the lens, the line of intersection being at an appreciable acute angle between 5° and 25° to the principal planes of the lens and two reflectors positioned respectively in the line of the beams reflected from said surfaces and oriented to rotate the beams oppositely through 90° and to reflect them into stereoscopic coincidence at the front focus of the lens.

2. An optical system according to claim 1 in which the two intersecting reflecting surfaces are the side faces of an isosceles prism whose apex is the line of intersection and whose base face is adjacent to the lens, whereby the beams between the surfaces and said two reflectors respectively passed through the opposite reflecting surface.

3. An optical system according to claim 1 in which the two intersecting reflecting surfaces are the side faces of an equilateral prism whose apex is the line of intersection and whose base face is adjacent to the lens, whereby the beams between the surfaces and said two reflectors respectively pass through the opposite reflecting surface.

4. An optical system according to claim 1 in which said acute angle is about 15°.

5. An optical system for taking stereoscopic pictures adjacent to one another and oppositiaxially oriented on a film which system comprises a camera having an objective lens, an isosceles prism mounted in front of the lens with its base face at an appreciable acute angle between 5° and 25° to the principal planes of the lens and two reflectors on opposite sides of the prism oriented to receive light beams from the subject to be photographed, to rotate them oppositely through 90° and to reflect them respectively through the side faces of the prism to the opposite side faces which are oriented to reflect these beams through the base face and crossingly through the lens.

6. An optical system according to claim 5 in which a mask is mounted in front of the reflectors to cut off from each beam any portion which would overlap the other beam at the back focus plane of the lens in the camera.

7. An optical system according to claim 5 in which the prism is equilateral.

8. An optical system according to claim 5 in which said acute angle is about 15°.

9. A stereoscopic attachment for a camera having an objective lens comprising a housing with a front window and a second window in one of the walls which is approximately horizontal, an equilateral prism mounted in the housing with its base face adjacent to said second window, means on the housing for attaching it to the lens with the second window and the prism in alignment with the lens and with said base face at an appreciable acute angle to the principal planes of the lens and two reflectors mounted in the housing to receive light beams through the front window, to rotate them oppositely through 90° and to reflect them respectively through the side faces of the prism to the opposite side faces which are oriented to reflect them through the base face of the prism and crossingly through the lens, one of the horizontal edges of the front window masking from each beam any portion which would overlap the other beam at the rear focus plane of the lens.

10. A stereoscopic attachment according to claim 9 in which said one of the edges of the front window is vertically adjustable to correspond to different lens apertures.

11. A stereoscopic attachment according to claim 9 in which said acute angle is between 5° and 25°.

12. A stereoscopic attachment according to claim 9 in which said acute angle is about 15°.

POMPEY MAINARDI.
MARCUS N. MAINARDI.